US012716292B1

(12) United States Patent
Collins

(10) Patent No.: US 12,716,292 B1
(45) Date of Patent: Aug. 25, 2026

(54) ANTI-DEFLECTION APPARATUS FOR ROLLER TUBE

(71) Applicant: Justin Collins, Lavon, TX (US)

(72) Inventor: Justin Collins, Lavon, TX (US)

( * ) Notice: Subject to any disclaimer, the term of this patent is extended or adjusted under 35 U.S.C. 154(b) by 0 days.

(21) Appl. No.: 19/335,704

(22) Filed: Sep. 22, 2025

(51) Int. Cl.
*E06B 9/44* (2006.01)

(52) U.S. Cl.
CPC .................................... *E06B 9/44* (2013.01)

(58) Field of Classification Search
CPC .... E06B 9/44; E06B 2009/2646; F16C 32/04; F16C 32/0412; F16C 32/0425; F16C 32/0436; F16C 32/0474; F16C 32/0478
See application file for complete search history.

(56) References Cited

U.S. PATENT DOCUMENTS 4,062,097 A * 12/1977 Riihinen .............. D21G 1/0213 492/8
4,301,582 A 11/1981 Riihinen
4,485,540 A 12/1984 Riihinen

FOREIGN PATENT DOCUMENTS

WO WO-2016003083 A1 * 1/2016 ............. F16C 32/04

OTHER PUBLICATIONS

Machine Translation of WO 2016/003083 A1 (Year: 2016).*
Zoom Tech, How Does Zoomtech® Work?, Retrieved From Internet, Retrieved on Sep. 19, 2025, <URL: https://www.zoomtech.eu/technology-zoomtech>.

* cited by examiner

*Primary Examiner* — Christopher J. Besler

(57) ABSTRACT

An anti-deflection apparatus for a roller tube is disclosed. The roller tube is elongated and has an internal channel. The apparatus includes an internal magnetic member and a bottom magnetic member. The internal magnetic member is disposed within the internal channel of the roller tube. The bottom magnetic member is disposed beneath the internal magnetic member and configured to exert a magnetic repulsive force on the internal magnetic member. Moreover, the bottom magnetic member is spaced apart from the roller tube by a predetermined distance.

18 Claims, 22 Drawing Sheets

ANTI-DEFLECTION APPARATUS FOR ROLLER TUBE

FIELD OF THE INVENTION

The present invention relates generally to attachments for retractable screens. More specifically, the present invention is an anti-deflection apparatus for a roller tube. The present invention is specifically designed for roller tubes of retractable screens. However, the present invention is not limited to this option, and it may further be adapted for different purposes.

BACKGROUND OF THE INVENTION

Current roller tubes used in shading systems, window coverings, and industrial fabric rollers are often required to span wide distances while supporting substantial material weight. Under such conditions, these roller tubes frequently experience mid-span deflection, commonly referred to as "sag." Sag can lead to uneven rolling of the material, misalignment, and reduced operational lifespan of the roller system. This issue becomes particularly significant in large-format applications or when supporting heavy fabrics, films, or similar materials.

Conventional approaches to mitigating roller sag typically rely on passive structural reinforcements, such as pre-stressed metal rods inserted within the roller tube. While these solutions can provide some degree of stiffness, they are limited in their ability to fully compensate for dynamic loading and gravitational deflection.

Therefore, it is an objective of the present invention to provide an anti-deflection apparatus that overcomes the problems set forth above.

SUMMARY OF THE INVENTION

The present invention discloses an anti-deflection apparatus for a roller tube. The roller tube is elongated and has an internal channel. The apparatus includes an internal magnetic member and a bottom magnetic member. The internal magnetic member is disposed within the internal channel of the roller tube. The bottom magnetic member is disposed beneath the internal magnetic member and configured to exert a magnetic repulsive force on the internal magnetic member. Moreover, the bottom magnetic member is spaced apart from the roller tube by a predetermined distance.

In one embodiment, the internal magnetic member is axially magnetized member.

In one embodiment, the present invention further comprises an internal holder to house the internal magnetic member.

In one embodiment, the internal holder comprises a holder body having a compartment to accommodate the internal magnetic member and a cap.

In one embodiment, the roller tube comprises a longitudinal slot, and the internal magnetic member has a cylindric shape with a groove. The groove of the internal magnetic member engages a backside of the longitudinal slot of the roller tube, such that the internal magnetic member rotates with the roller tube.

In one embodiment, the present invention further comprises a top magnetic member disposed above the internal magnetic member and configured to exert an attractive force on the internal magnetic member.

In one embodiment, the present invention further comprises a front magnetic member disposed in front of the internal magnetic member and configured to exert a repulsive force on the internal magnetic member; and a rear magnetic member disposed behind the internal magnetic member and configured to exert a repulsive force on the internal magnetic member.

In one embodiment, the present invention further comprises a first external holder having a top portion configured to accommodate the top magnetic member, a front portion configured to accommodate the front magnetic member, and a bottom portion configured to accommodate the bottom magnetic member.

In one embodiment, the bottom portion comprises a proximal part and a distal part arranged at an angle with respect to each other.

In one embodiment, the proximal part and the distal part are each disposed in an orientation substantially perpendicular to a radial direction of the roller tube.

In one embodiment, the present invention further comprises a second external holder configured to accommodate the rear magnetic member.

In one embodiment, the top magnetic member, the front magnetic member, and the rear magnetic member each comprise a pair of magnetic members.

In one embodiment, the bottom magnetic member comprises a pair of magnetic members disposed in the proximal part and a pair of magnetic members disposed in the distal part.

In one embodiment, the present invention further comprises a mounting bracket, the mounting bracket comprising a top plate, a front plate, and a bottom plate.

In one embodiment, the top portion, front portion, and the bottom portion of the first external holder are attached to the top plate, the front plate, and the bottom plate of the mounting bracket, respectively.

In one embodiment, the mounting bracket is made from magnetic metal such that the top portion, front portion, and bottom portion of the first external holder are magnetically attached to the top plate, front plate, and bottom plate of the mounting bracket, respectively, by corresponding magnetic members accommodated in the top portion, front portion, and bottom portion of the first external holder.

BRIEF DESCRIPTION OF THE DRAWINGS

The accompanying drawings, which are included to provide a further understanding of the invention, are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the present invention. That is, the dimensions of the components of the present invention, independently and in relation to each other, can be different. It should be noted that the drawings are schematic and not necessarily drawn to scale. Some drawings are enlarged or reduced to improve drawing legibility.

DETAIL DESCRIPTION OF THE INVENTION

Figure 1:
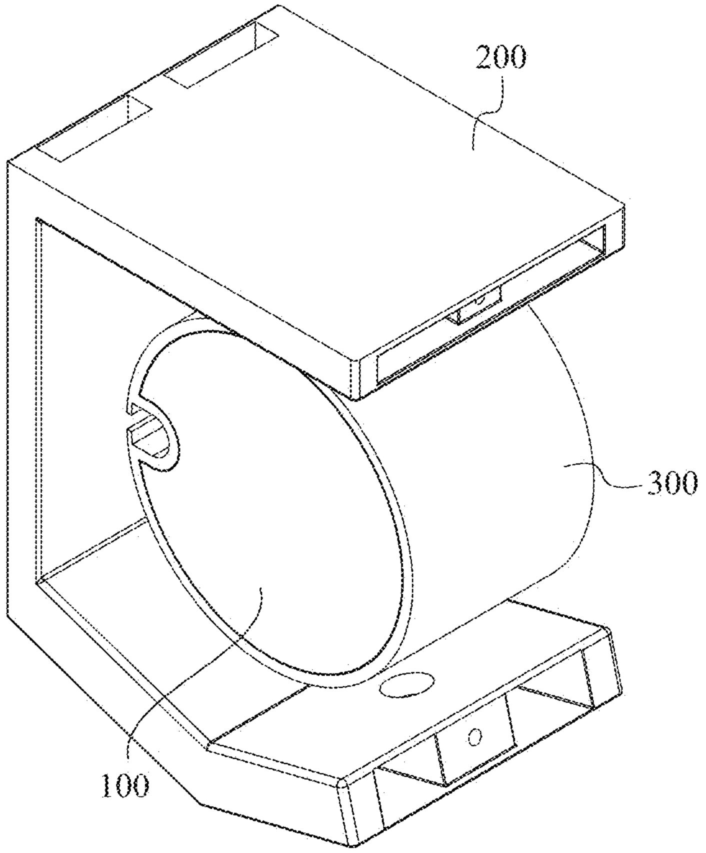
FIG. 1 depicts a perspective view of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "proximal" refers to positions that are situated close/near in relationship to a structure. As used in the following description, the term "distal" refers to positions that are situated away from positions.

The present invention is an anti-deflection apparatus for a roller tube. The roller tube can be used in shading systems, window coverings, projection screens, industrial fabric rollers, packaging machinery, etc. It is an aim of the present invention to provide an active compensation apparatus to dynamically counteract gravitational deflection.

Referring now to the figures of the present disclosure, the general concept of the present invention is to employ an internal magnetic assembly that interacts with a plurality of external magnetic members disposed around the roller tube 300. Through controlled magnetic attraction and repulsion forces, the apparatus counterbalances the downward bending tendency of the roller tube 300, reducing sagging during operation. The system can be integrated into standard roller tube 300 constructions without significantly increasing weight or altering external dimensions, thereby providing a practical and scalable solution.

In one embodiment, the anti-deflection apparatus of the present invention is provided for use with a roller tube 300. The roller tube 300 is an elongated member and has an internal channel extending along its longitudinal axis. It should be understood that, for purposes of illustration, only a partial segment of the roller tube 300 is depicted in the drawings. The anti-deflection apparatus of the present invention comprises an internal magnetic member 101 disposed within the internal channel of the roller tube 300, and a bottom magnetic member 231 disposed beneath the internal magnetic member 101 and configured to exert a magnetic repulsive force on the internal magnetic member 101. The bottom magnetic member 231 is spaced apart from the roller tube 300 by a predetermined distance. Therefore, a clearance is defined between the roller tube 300 and the bottom magnetic member 231, thereby enabling the material (e.g., screen) to be wound onto the roller tube 300 in a proper and uniform manner without interference.

Figure 11:
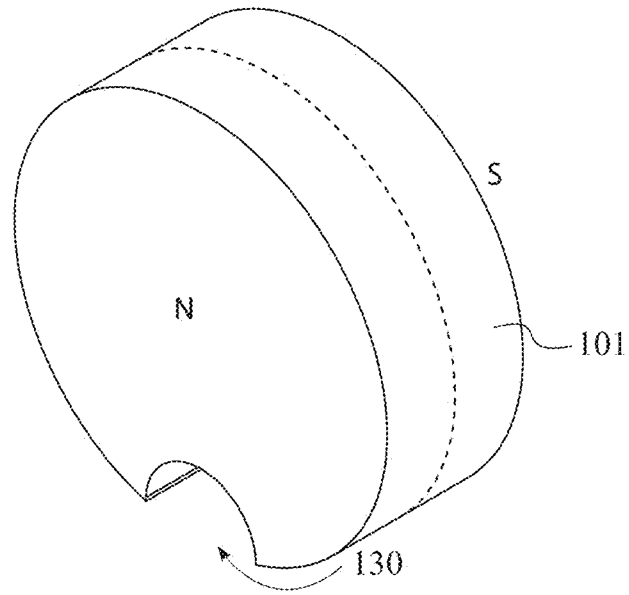
FIG. 11 depicts a perspective view of the internal magnetic member of the present invention.

In one embodiment, the internal magnetic member 101 is axially magnetized. As illustrated in FIG. 11, the internal magnetic member 101 is preferably configured as an axially magnetized disk member with its north and south poles on opposing circular faces thereof, such that the magnetic forces remain oriented in fixed positions irrespective of rotational movement of the internal magnetic member 101. This configuration allows the internal magnetic member 101 to rotate with, or remain stationary relative to, the roller tube 300. The internal magnetic member 101 is further dimensioned and shaped to be positioned in close proximity to an interior wall of the roller tube 300 so as to maximize the magnetic forces generated, while still permitting the internal magnetic member 101 to slide along an internal channel of the roller tube 300.

Figure 10:
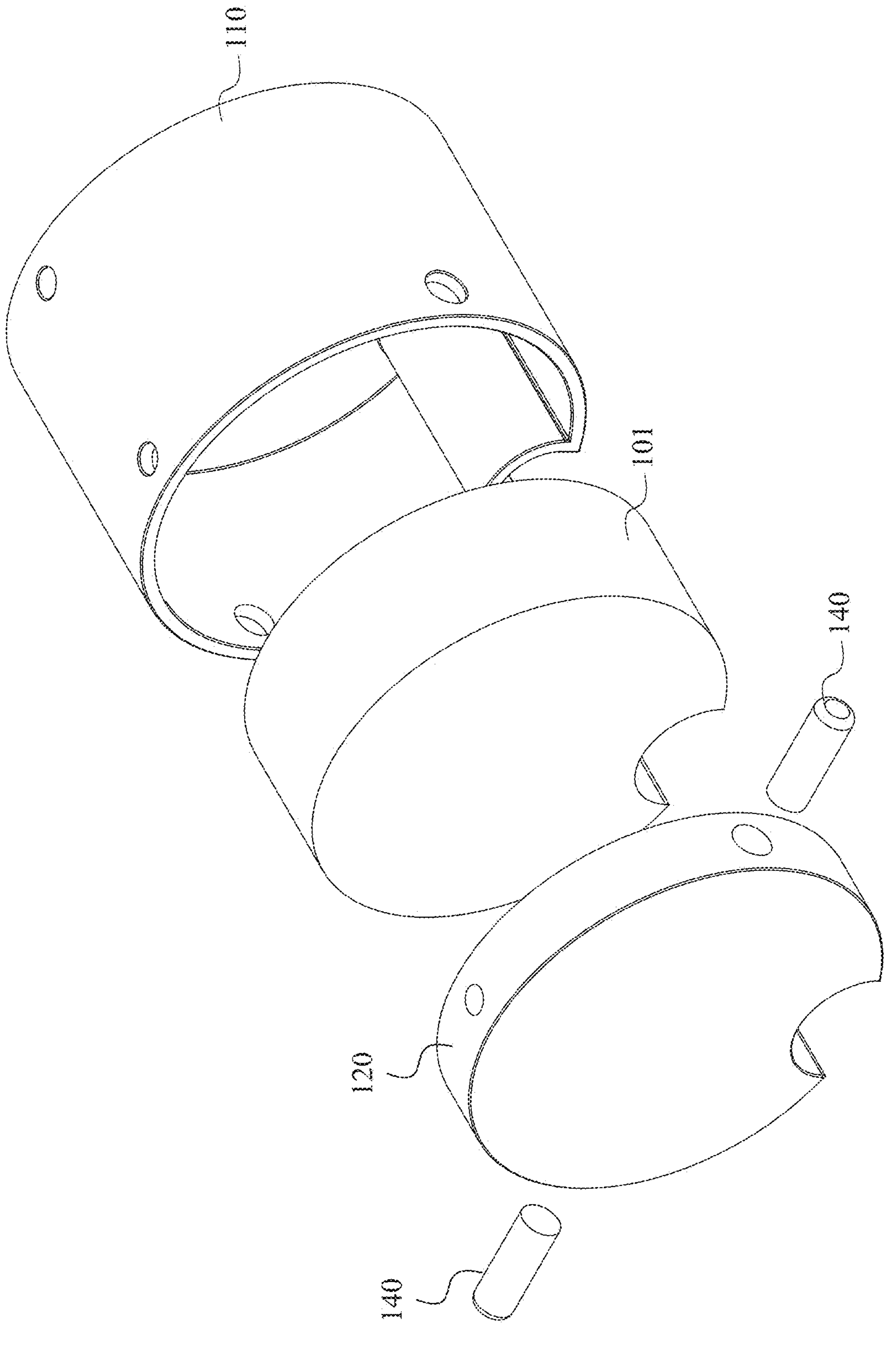
FIG. 10 depicts an exploded perspective view of the internal holder and internal magnetic member of the present invention.

In one embodiment, the present invention further comprises an internal holder 100 to house the internal magnetic member 101. The internal holder 100 has a shape corresponding to the internal contour of the internal channel of the roller tube and includes a groove that engages the backside of the longitudinal slot 330 of the roller tube 300. In one embodiment, the internal holder 100 comprises a holder body 110 having a compartment to accommodate the internal magnetic member 101 and a cap 120. The cap 120 is configured to close the compartment, thereby retaining the internal magnetic member 101 while allowing for assembly and disassembly when required. In one embodiment, the cap 120 is provided with two blind holes dimensioned to receive dowel pins 140. Correspondingly, the holder body 110 is formed with two through-holes aligned with the blind holes of the cap 120. During assembly, the dowel pins 140 may be inserted through the through-holes of the holder body 110 and into the blind holes of the cap 120, thereby securing the cap 120 to the holder body 110, as shown in FIG. 10. Furthermore, the holder body 110 may further comprise a plurality of smaller holes configured to receive fasteners. The fasteners may secure the internal holder 100 to the roller tube 300 after the internal holder 100 has been positioned at a desired longitudinal location along the roller tube 300.

Figure 2:
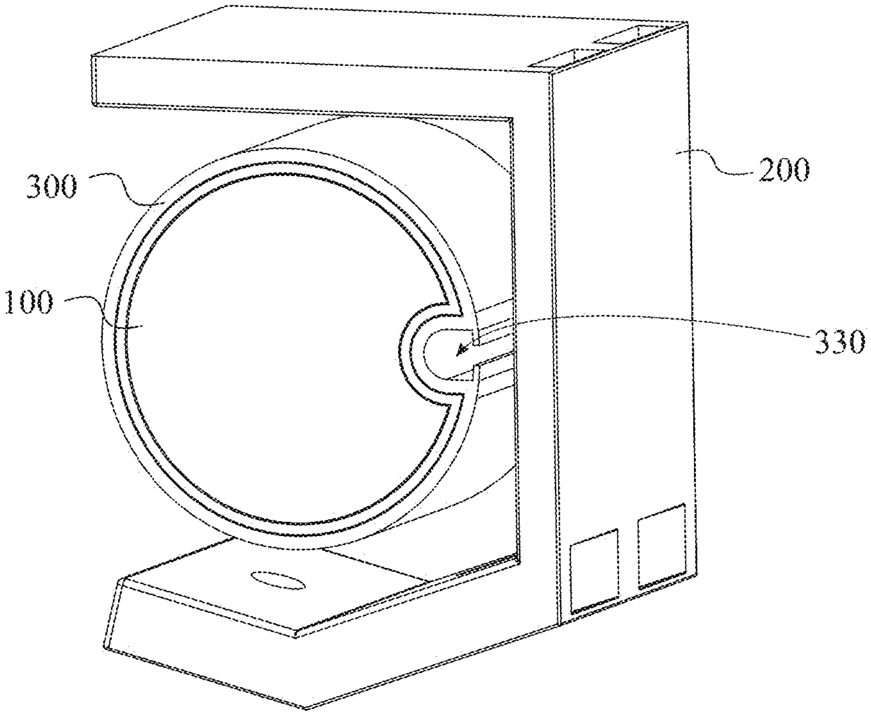
FIG. 2 depicts another perspective view of the present invention.
Figure 3:
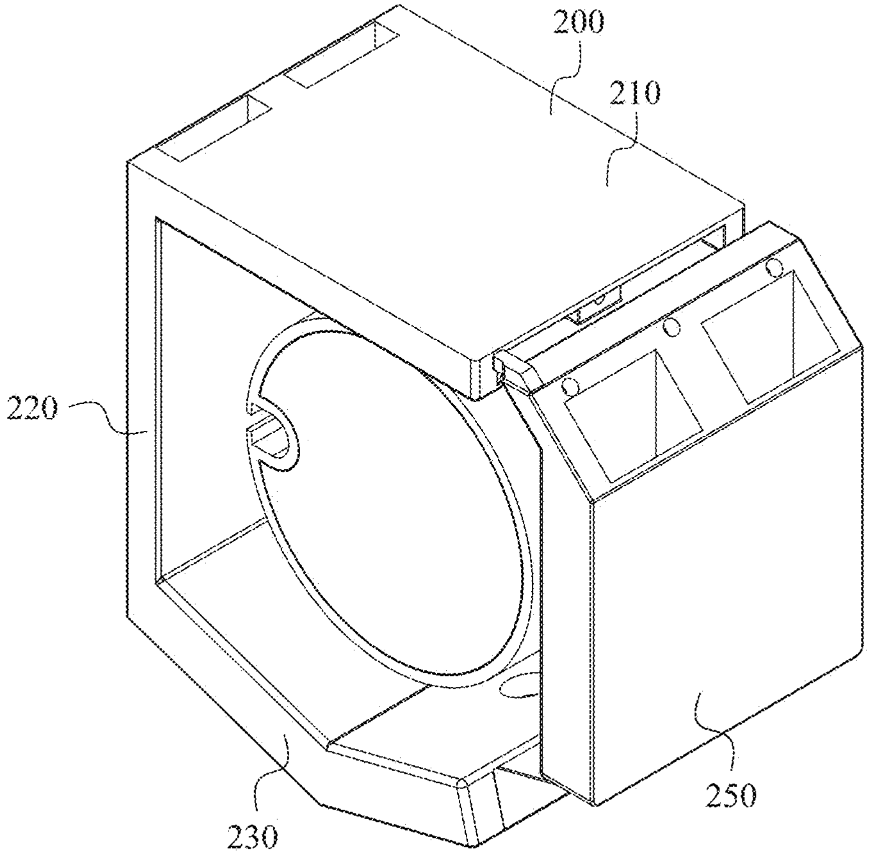
FIG. 3 depicts a perspective view of the present invention, wherein the second external holder is included.
Figure 4:
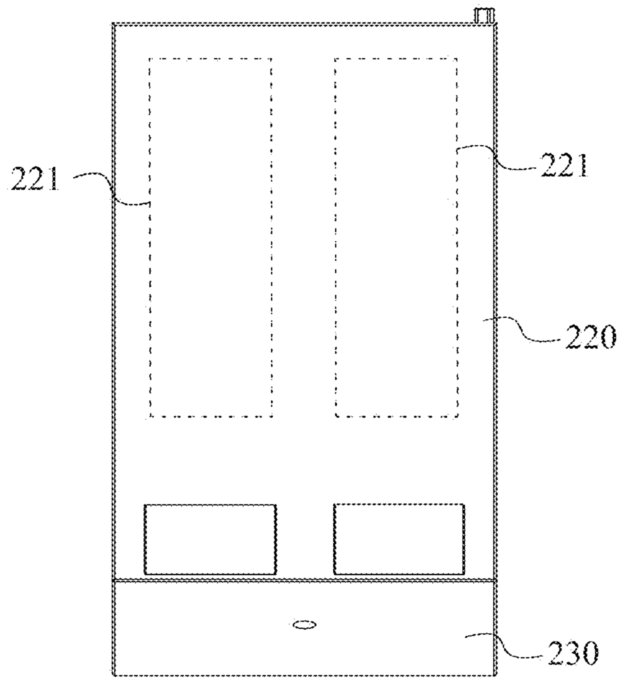
FIG. 4 depicts a front view of the present invention, wherein the magnetic members inside are shown in broken lines.
Figure 5:
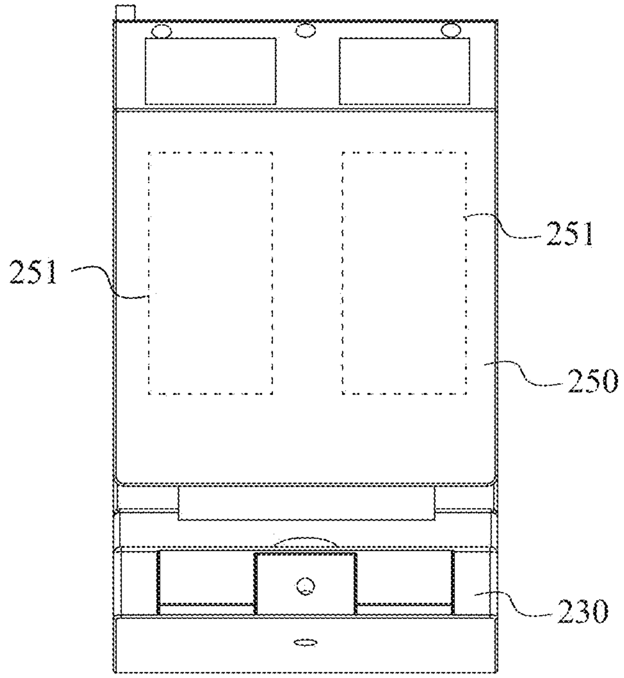
FIG. 5 depicts a rear view of the present invention, wherein the magnetic members inside are shown in broken lines.
Figure 6:
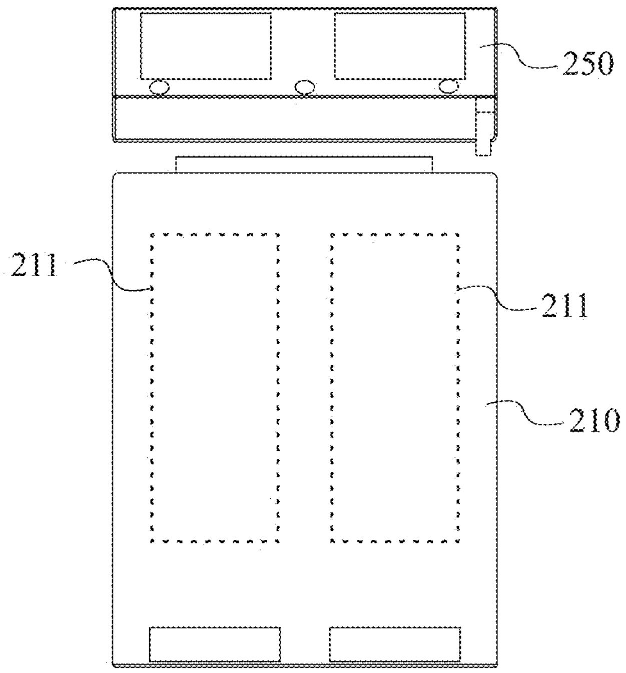
FIG. 6 depicts a top view of the present invention, wherein the magnetic members inside are shown in broken lines.
Figure 7:
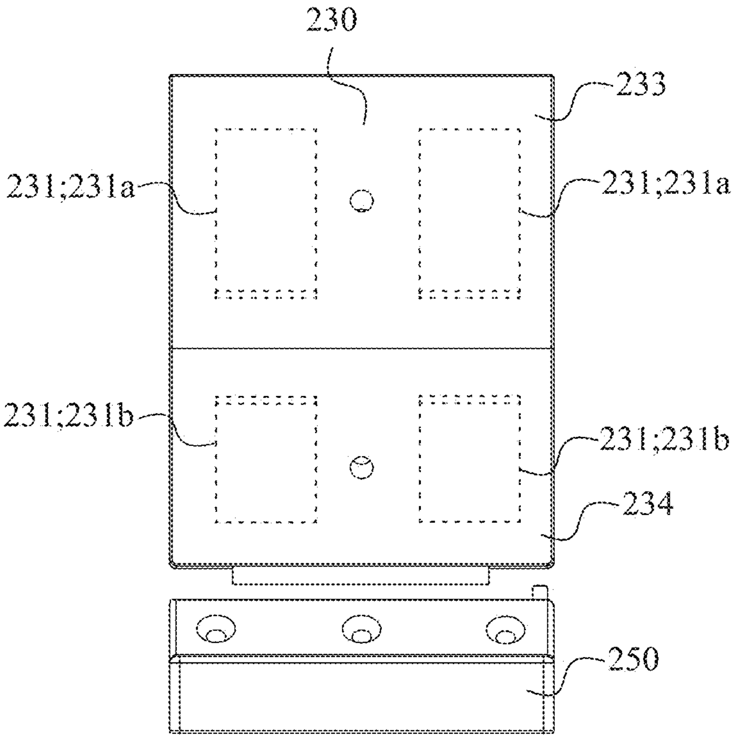
FIG. 7 depicts a bottom view of the present invention, wherein the magnetic members inside are shown in broken lines.

In one embodiment, the roller tube 300 comprises a longitudinal slot 330 extending along its length, as shown in FIG. 2. The internal magnetic member 101 has a cylindric shape provided with a groove 130, as shown in FIG. 11. The groove 130 of the internal magnetic member 101 is arranged to engage a backside of the longitudinal slot 330 of the roller tube 300. By engaging the slot 330 in this manner, the internal magnetic member 101 is caused to rotate together with the roller tube 300. At the same time, the internal magnetic member 101 remains free to slide axially along the internal channel of the roller tube 300. This arrangement ensures that the internal magnetic member 101 maintains positional alignment with the roller tube 300 throughout rotation.

Once the internal holder 100 is inserted into the roller tube from one end thereof, a sleeve 500 can be used to guide the internal holder 100 to a desired location. The sleeve 500 generally has a ring-shaped configuration, with an internal diameter slightly larger than the outer diameter of the roller tube 300, thereby enabling the sleeve 500 to slide smoothly along the roller tube. The sleeve 500 is made from magnetic material and is configured to magnetically attract the internal magnetic member 101 housed in the internal holder 100. Accordingly, as the sleeve 500 is moved along the exterior of the roller tube 300, the internal holder 100 is correspondingly displaced along the internal channel of the roller tube 300.

The sleeve 500 comprises an internal ridge 501, an outer central mark 502, and a plurality of fastener positioning holes 503. The internal ridge 501 serves to engage the longitudinal slot 330 of the roller tube 300 to prevent the sleeve 500 from rotating relative to the roller tube 300. The outer central mark 502 corresponds to the midpoint of the internal magnetic member. The outer central mark 502 facilitates accurate positioning of the external magnetic members with respect to the internal magnetic member. The plurality of fastener positioning holes 503 corresponds to the plurality of smaller holes on the holder body 110, thereby indicating to the user the appropriate drilling locations on the roller tube 300 for fasteners.

Although the present invention may function with a bottom magnetic member 231, it is preferred that the present invention further comprises one or more external magnetic members disposed in different orientations relative to the internal magnetic member 101. Such external magnetic members may be configured to generate repulsive forces from multiple directions and, in certain embodiments, to exert attractive forces as well. The combined effect of these magnetic interactions serves to more effectively counteract gravitational deflection of the roller tube 300.

Figure 8:
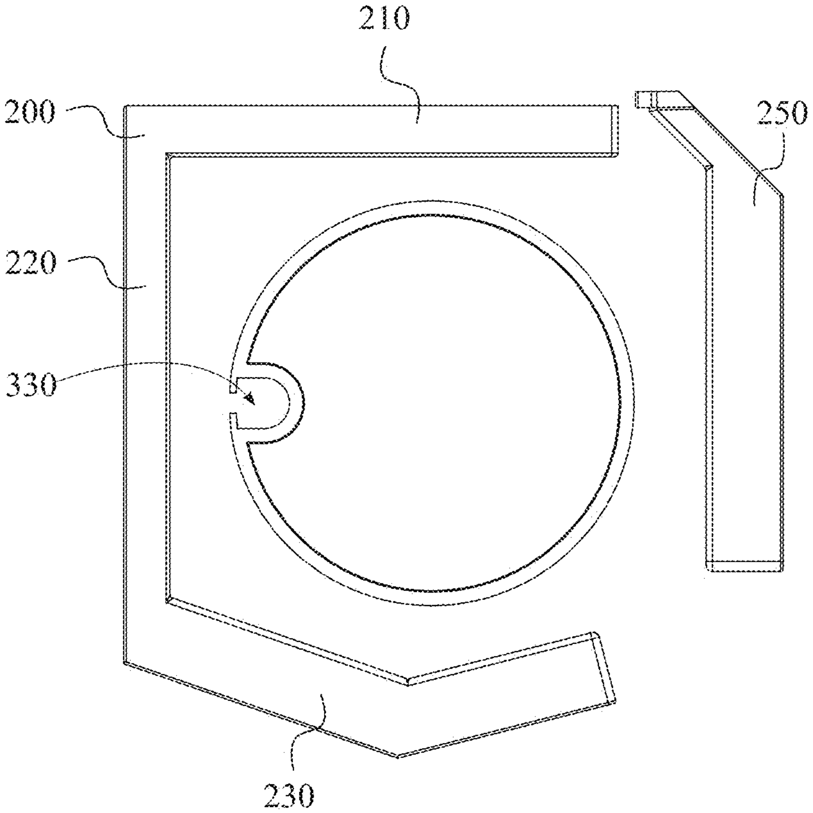
FIG. 8 depicts a right-side view of the present invention.
Figure 9:
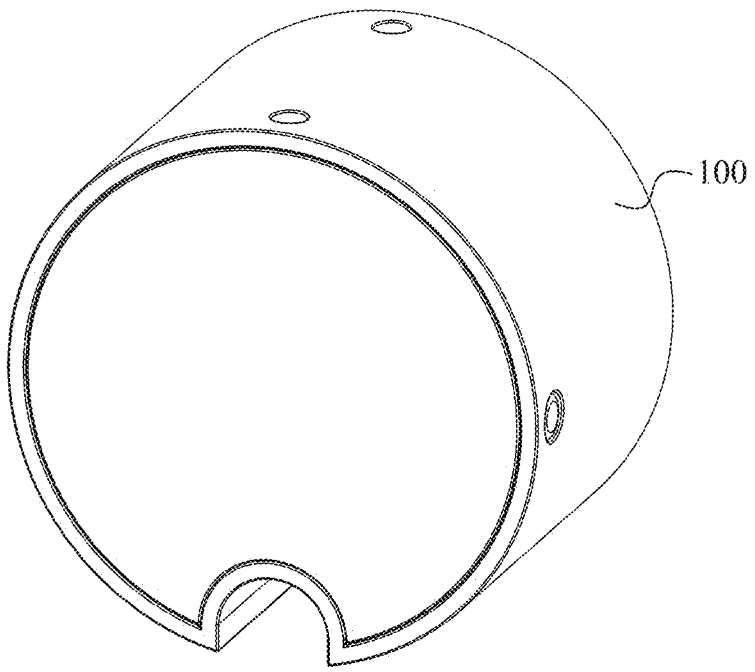
FIG. 9 depicts a perspective view of the internal holder of the present invention.

In one embodiment, the present invention further comprises a top magnetic member 211 disposed above the internal magnetic member 101 and configured to exert an attractive force on the internal magnetic member 101. The attractive force assists in counteracting downward deflection and stabilizes the roller tube 300 vertically. In another embodiment, the present invention further comprises a front magnetic member 221 disposed in front of the internal magnetic member 101 and configured to exert a repulsive force on the internal magnetic member 101. In yet another embodiment, the present invention further comprises a rear magnetic member 251 disposed behind the internal magnetic member 101 and configured to exert a repulsive force on the internal magnetic member 101. In this configuration, the bottom magnetic member 231 provides a primary upward repulsive force acting against the internal magnetic member 101. The top magnetic member 211 may be disposed to exert an attractive stabilizing force, while the front magnetic member 221 and rear magnetic member 251 may be positioned to apply lateral balancing forces. The combined action of these magnetic forces can effectively reduce gravitational sag. It should be noted that all the external magnetic members should be spaced apart from the roller tube 300 by a predetermined distance so as to provide a clearance around the tube, allowing the material to roll up properly, as best shown in FIG. 8. Further, the bottom magnetic member 231, top magnetic member 211, front magnetic member 221, and rear magnetic member 251 may be employed individually or in any combination thereof, depending on design requirements.

The external magnetic members are preferably accommodated in external holders. In the illustrated embodiment, the present invention comprises a first external holder 200 having a top portion 210, a front portion 220, and a bottom portion 230. The top portion 210 is configured to accommodate the top magnetic member 211, the front portion 220 is configured to accommodate the front magnetic member 221, and the bottom portion 230 is configured to accommodate the bottom magnetic member 231. In one embodiment, the top portion 210 and the bottom portion 230 extend rearwardly from the top side and the bottom side of the front portion 220, respectively, such that the three portions of the first external holder 200 collectively define a "C"-shaped structure. It is preferred that the three portions of the first external holder 200 are oriented substantially perpendicular to a radial direction of the roller tube 300.

In a preferred embodiment, the bottom portion 230 comprises a proximal part 233 and a distal part 234 arranged at an angle with respect to each other. It should be noted that the proximal part 233 and the distal part 234 are preferably each disposed substantially perpendicular to a radial direction of the roller tube 300. By dividing the bottom portion 230 into angled proximal and distal parts, the bottom magnetic member 231 is configured to generate repulsive forces that act upon the internal magnetic member 101 from two distinct directions, thereby enhancing the effectiveness of vertical compensation.

In one embodiment, the present invention further comprises a second external holder 250 configured to accommodate the rear magnetic member 251. This arrangement allows an opening to form between the distal part 234 of the first external holder 200 and the lower end of the second external holder 250, such that material (e.g., a screen) can be rolled up and down through the opening.

Moreover, each external magnetic member may be constructed from multiple magnetic units. This multi-unit arrangement of the external magnetic members provides enhanced magnetic interaction with the internal magnetic member 101, thereby improving stability and performance of the apparatus. In one embodiment, the top magnetic member 211, the front magnetic member 221, and the rear magnetic member 251 each comprise a pair of magnetic members. In a preferred embodiment, the bottom magnetic member 231 comprises a pair of magnetic members **231*a* in the proximal part 233 and a pair of magnetic members 231*b* in the distal part 234. In this configuration, the system may include a total of ten external magnetic members and one internal magnetic member 101. In one embodiment, the top, front, and rear magnetic members are of uniform size and smaller than the larger bottom magnetic member 231**, which is configured to provide the principal repulsive force required for deflection compensation. It should be noted the first and second external holders should be made from nonmagnetic material, including but not limited to plastic.

The external magnetic members may be installed into and removed from their respective compartments of the first external holder 200. In one embodiment, a pair of bottom magnetic members **231*b* positioned in the distal part 234 of the bottom portion 230 of the first external holder 200 may be installed by insertion through the distal end of the bottom portion 230, while another pair of bottom magnetic members 231*a* positioned in the proximal part 233 of the bottom portion 230 may be installed by insertion through the proximal end. To prevent displacement, the distal part 234 is further provided with a cover plate 235 that restricts the bottom magnetic members 231** from sliding out of position.

Similarly, the top magnetic member 211 may be installed by inserting it through the distal end of the top portion 210 of the first external holder 200, and a corresponding cover plate 215 may also be provided to secure it in place. In the illustrated embodiment, the front magnetic member 221 may be installed by insertion through the top end of the front portion 220 of the first external holder 200. It should be noted that the opening(s) at the proximal end of the bottom portion 230 and the opening(s) at the top end of the front portion 220 of the first external holder 200 need not be covered, as these openings are closed by the mounting bracket 400, which will be described in greater detail hereinafter.

In one embodiment, the present invention further comprises a mounting bracket 400, the mounting bracket 400 comprising a top plate 410, a front plate 420, and a bottom plate 430. The mounting bracket 400 has a shape corresponding to the contour of the first external holder 200 such that the top portion 210, front portion 220, and the bottom portion 230 of the first external holder 200 can be attached to the top plate 410, front plate 420, and bottom plate 430 of the mounting bracket 400, respectively. Moreover, the mounting bracket 400 is preferably made from magnetic metal. Therefore, when the external magnetic members are installed in the first external holder 200, the top portion 210, front portion 220, and bottom portion 230 of the first external holder 200 are magnetically attached to the top plate 410, front plate 420, and bottom plate 430 of the mounting bracket 400, respectively, by corresponding magnetic members accommodated in the top portion 210, front portion 220, and bottom portion 230 of the first external holder 200. This magnetic coupling simplifies assembly, reduces reliance on mechanical fastening, and permits easy repositioning or removal of the first external holder 200 when required. Once the longitudinal position of the first external holder 200 is determined, the mounting bracket 400 can be installed to an external object 600 (e.g., a screen cassette). Moreover, it should be noted that the second external holder 250 may be installed directly onto the external object.

Figure 12:
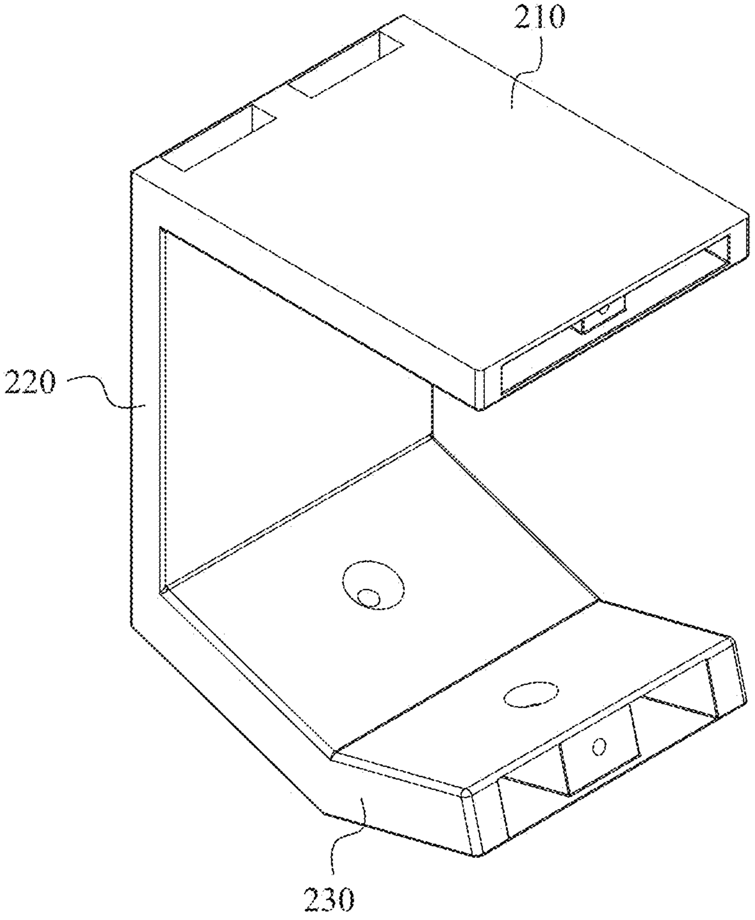
FIG. 12 depicts a perspective view of the first external holder of the present invention.
Figure 13:
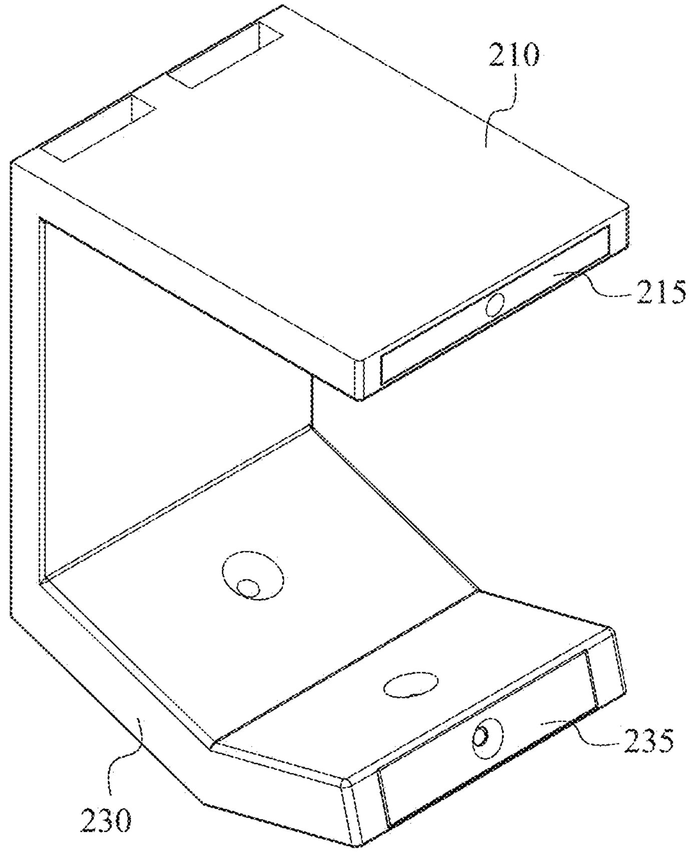
FIG. 13 depicts another perspective view of the first external holder of the present invention.
Figure 14:
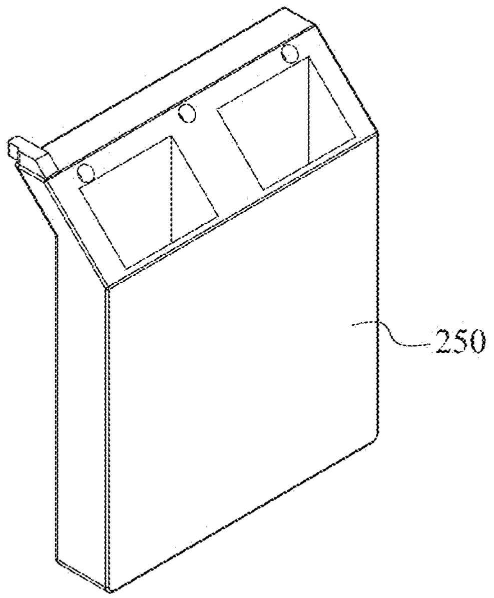
FIG. 14 depicts a perspective view of the second external holder of the present invention.
Figure 15:
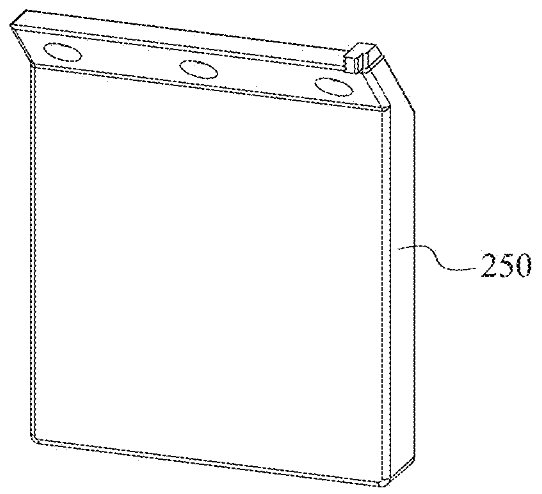
FIG. 15 depicts another perspective view of the second external holder of the present invention.
Figure 16:
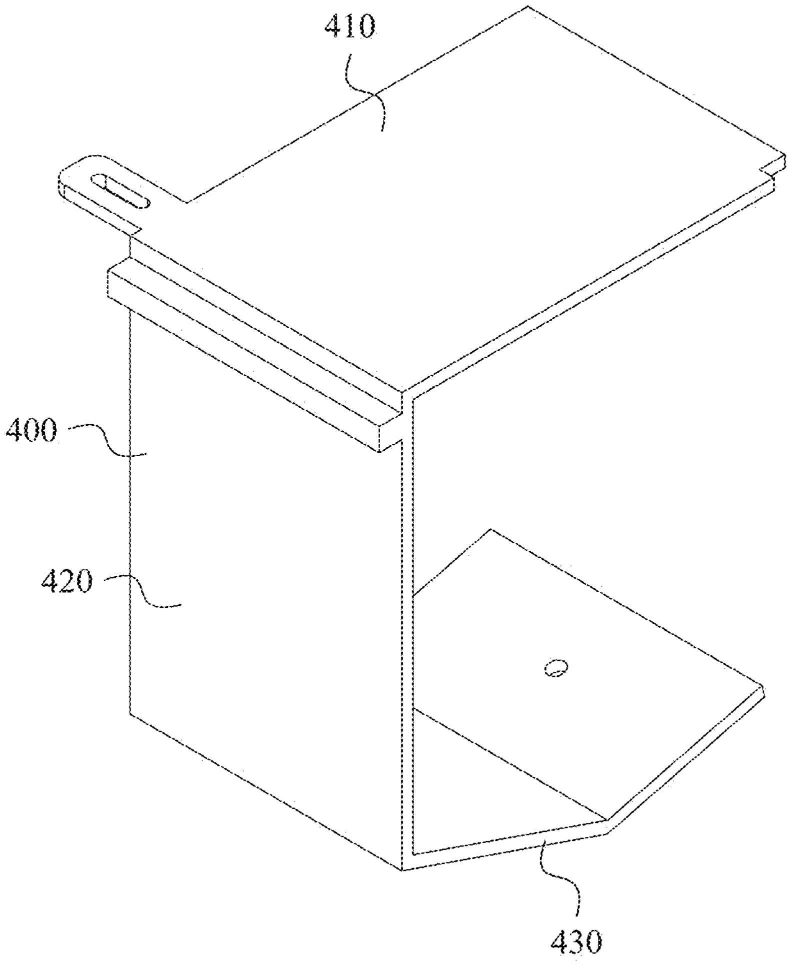
FIG. 16 depicts a perspective view of the mounting bracket of the present invention.
Figure 17:
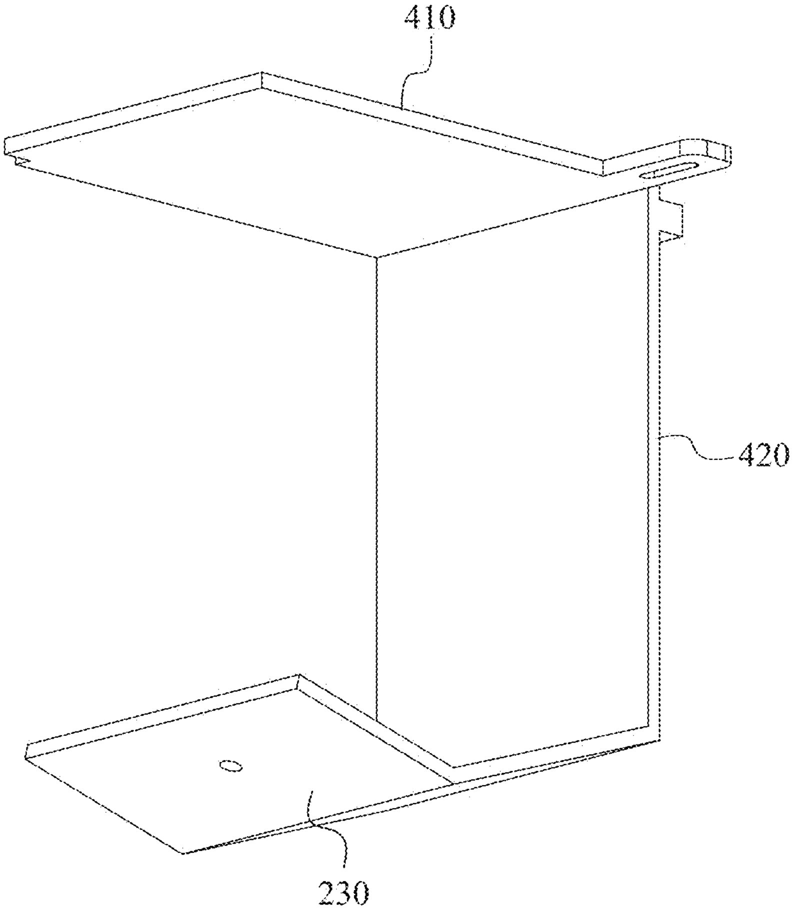
FIG. 17 depicts another perspective view of the mounting bracket of the present invention.
Figure 18:
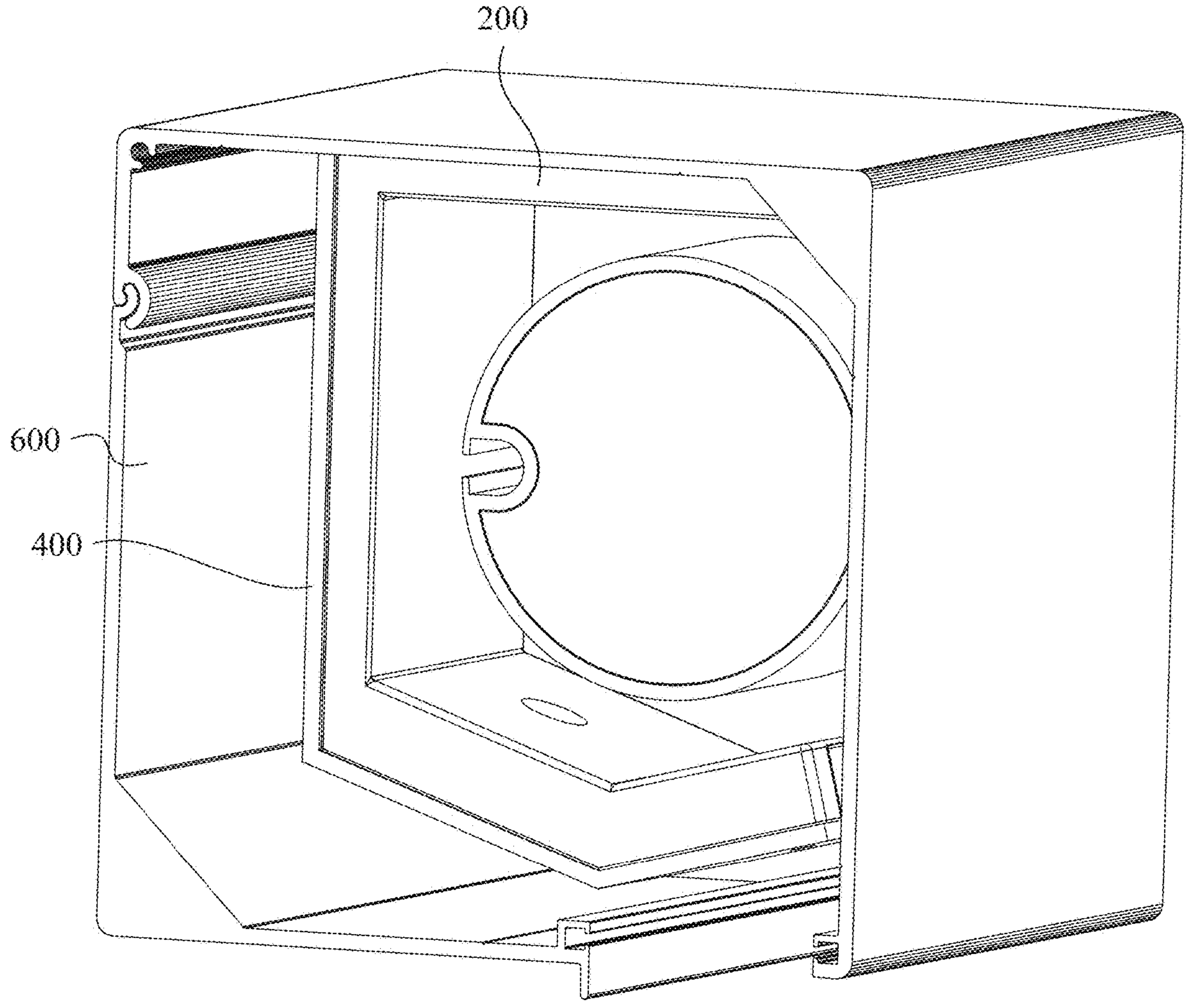
FIG. 18 depicts a perspective view of the present invention installed on an external cassette.
Figure 19:
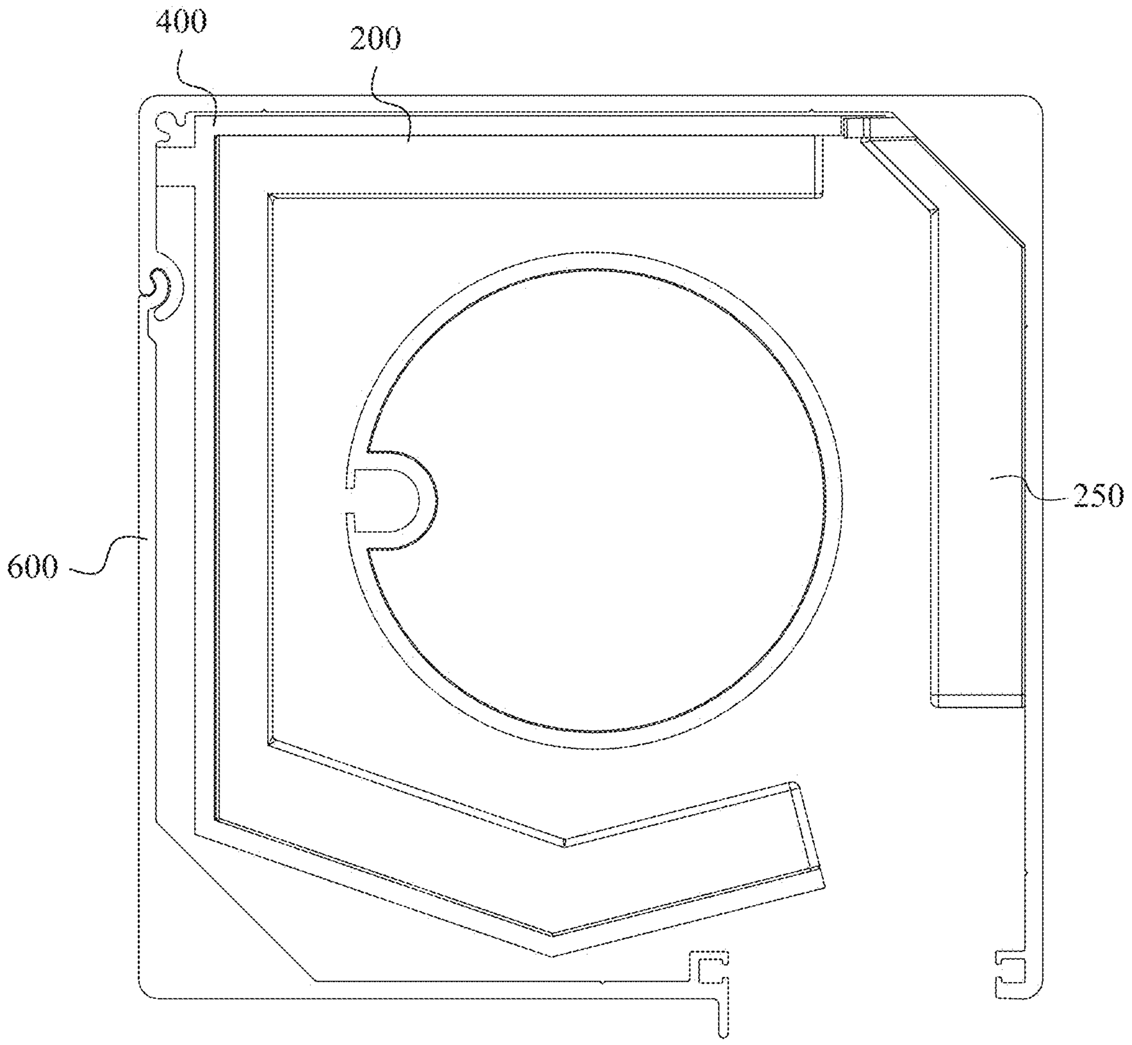
FIG. 19 depicts a right-side view of the present invention installed on the external cassette.
Figure 20:
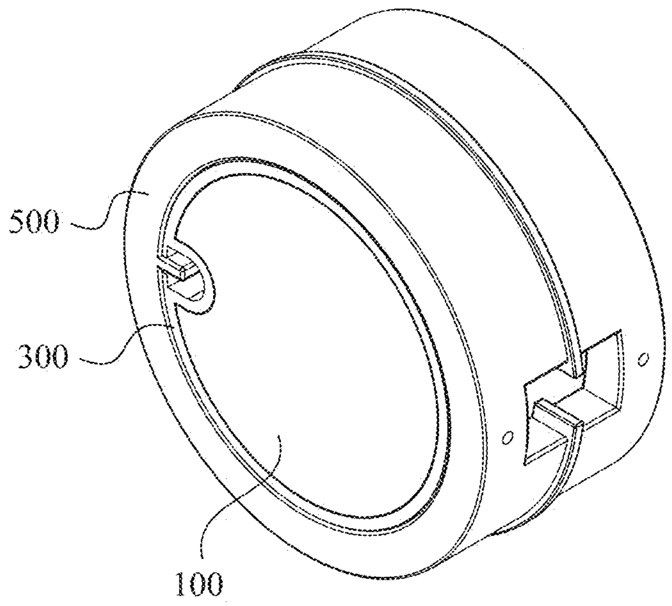
FIG. 20 depicts a perspective view of the present invention, wherein a sleeve is used to move the internal magnetic member.
Figure 21:
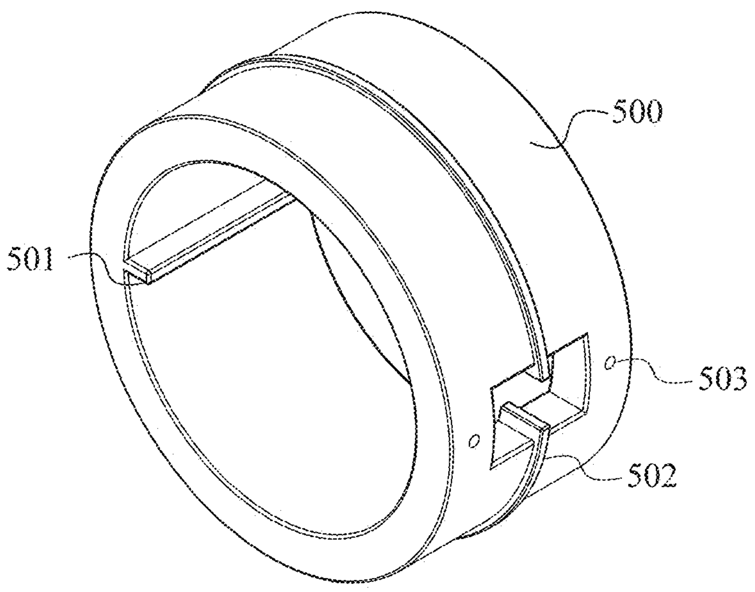
FIG. 21 depicts a perspective view of the sleeve of the present invention.
Figure 22:
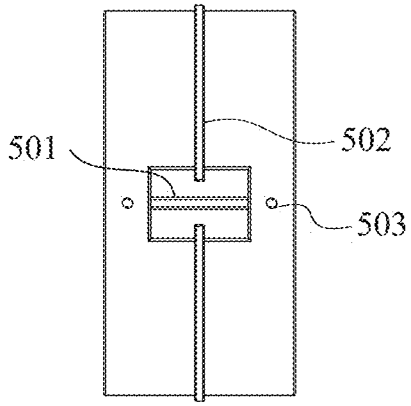
FIG. 22 depicts a rear view of the sleeve of the present invention.

In case it is desired that the first external holder 200 be installed onto the mounting bracket 400 via screws or other suitable fasteners, the first external holder 200 is also provided with one or more predrilled fastener holes to facilitate installation, as shown in FIGS. 12-13. Similarly, the second external holder 250 may also be provided with one or more predrilled fastener holes, as shown in FIGS. 14-15. In the illustrated embodiment, the predrilled fastener holes are formed in the bottom plate 430 of the first external holder 200 and in the top portion of the second external holder 250. However, it should be noted that the predrilled fastener holes can be positioned at any other suitable location without interfering with the operation of the present invention.

It should be noted that multiple apparatuses of the present invention can be used in tandem, potentially allowing for application to roller tubes of unlimited length. In one example, a prototype assembly measuring 54 feet in length and incorporating four anti-deflection apparatuses successfully supported a central load of approximately 55 pounds while maintaining balanced rolling performance. These results confirm that the apparatus may be applied to roller tubes of virtually any length, limited only by coupling and supporting requirements, and can be scaled to accommodate different tube diameters, as exemplified by successful testing on a 3-inch diameter tube. Accordingly, the invention provides a versatile solution for long-span roller tube applications such as screens, shading systems, industrial fabric rollers, etc.

Although the disclosure has been explained in relation to its preferred embodiment, it is to be understood that many other possible modifications and variations can be made without departing from the spirit and scope of the disclosure.

What is claimed is:

1. An anti-deflection apparatus, comprising:

a non-magnetic roller tube having an elongated wall defining an internal channel;

an internal magnetic member disposed within the internal channel of the non-magnetic roller tube, the internal magnetic member being an axially magnetized disk having a north pole and a south pole on opposing circular faces thereof; and a discrete bottom magnetic member disposed exterior to and beneath the non-magnetic roller tube, wherein the discrete bottom magnetic member is fixed relative to the non-magnetic roller tube such that the non-magnetic roller tube is rotatable relative to the discrete bottom magnetic member, the discrete bottom magnetic member having a magnetic polarity positionally aligned to face a like magnetic polarity of the internal magnetic member through the elongated wall of the non-magnetic roller tube;

wherein the discrete bottom magnetic member is spaced apart from the non-magnetic roller tube by a predetermined physical distance, the predetermined physical distance being an unobstructed material-winding clearance between the non-magnetic roller tube and the discrete bottom magnetic member; and wherein a repulsive magnetic force acts across a rotating-stationary-boundary between the internal magnetic member and the discrete bottom magnetic member to continuously counteract gravitational deflection of the non-magnetic roller tube.

2. The anti-deflection apparatus as claimed in claim 1, further comprising an internal holder to house the internal magnetic member.

3. The anti-deflection apparatus as claimed in claim 2, wherein the non-magnetic roller tube comprises a longitudinal slot, and the internal magnetic member has a cylindric shape with a groove, and wherein the groove of the internal magnetic member positively engages a backside of the longitudinal slot of the non-magnetic roller tube, such that the internal magnetic member rotates with the non-magnetic roller tube.

4. The anti-deflection apparatus as claimed in claim 1, further comprising:

a front magnetic member disposed in front of the internal magnetic member and configured to exert a repulsive force on the internal magnetic member; and a rear magnetic member disposed behind the internal magnetic member and configured to exert a repulsive force on the internal magnetic member.

5. The anti-deflection apparatus as claimed in claim 4, further comprising a first external holder, wherein the first external holder includes a top portion configured to accommodate a top magnetic member, a front portion configured to accommodate the front magnetic member, and a bottom portion configured to accommodate the discrete bottom magnetic member.

6. The anti-deflection apparatus as claimed in claim 5, wherein the bottom portion comprises a proximal part and a distal part arranged at an angle with respect to each other.

7. The anti-deflection apparatus as claimed in claim 6, wherein the proximal part and the distal part are each disposed in an orientation perpendicular to a radial direction of the non-magnetic roller tube.

8. The anti-deflection apparatus as claimed in claim 7, further comprising a second external holder configured to accommodate the rear magnetic member.

9. The anti-deflection apparatus as claimed in claim 8, wherein the discrete bottom magnetic member comprises a pair of magnetic members disposed in the proximal part and a pair of magnetic members disposed in the distal part.

10. The anti-deflection apparatus as claimed in claim 8, further comprising a mounting bracket, the mounting bracket comprising a top plate, a front plate, and a bottom plate.

11. The anti-deflection apparatus as claimed in claim 10, wherein the top portion, front portion, and the bottom portion of the first external holder are attached to the top plate, the front plate, and the bottom plate of the mounting bracket, respectively.

12. The anti-deflection apparatus as claimed in claim 11, wherein the mounting bracket is made from magnetic metal such that the top portion, front portion, and bottom portion of the first external holder are magnetically attached to the top plate, front plate, and bottom plate of the mounting bracket, respectively, by the top magnetic member, the front magnetic member, and the discrete bottom magnetic member accommodated in the top portion, front portion, and bottom portion, respectively, of the first external holder.

13. The anti-deflection apparatus as claimed in claim 1, further comprising an internal holder housing the internal magnetic member, wherein the internal holder is secured to the non-magnetic roller tube via a fastener.

14. The anti-deflection apparatus of claim 1, wherein the repulsive magnetic force acting across the boundary applies a corrective magnetic loading to the non-magnetic roller tube, the corrective magnetic loading providing dynamical structural bending compensation by counterbalancing a downward bending tendency of the non-magnetic roller tube.

15. The anti-deflection apparatus as claimed in claim 1, wherein the internal magnetic member remains stationary relative to the non-magnetic roller tube during rotation of the non-magnetic roller tube.

16. The anti-deflection apparatus as claimed in claim 15, wherein the non-magnetic roller tube has a circular cross-section without a longitudinal slot, and wherein the internal magnetic member is secured to an interior wall of the non-magnetic roller tube via a fastener.

17. The anti-deflection apparatus as claimed in claim 16, further comprising a plurality of internal magnetic members disposed at predetermined intervals within the internal channel, and a plurality of corresponding discrete bottom magnetic members.

18. The anti-deflection apparatus as claimed in claim 4, wherein the front magnetic member comprises a pair of front magnetic members and the rear magnetic member comprises a pair of rear magnetic members.

* * * * *